April 17, 1951     A. C. GODDARD     2,549,375
BREAD TOASTER
Filed Dec. 8, 1949
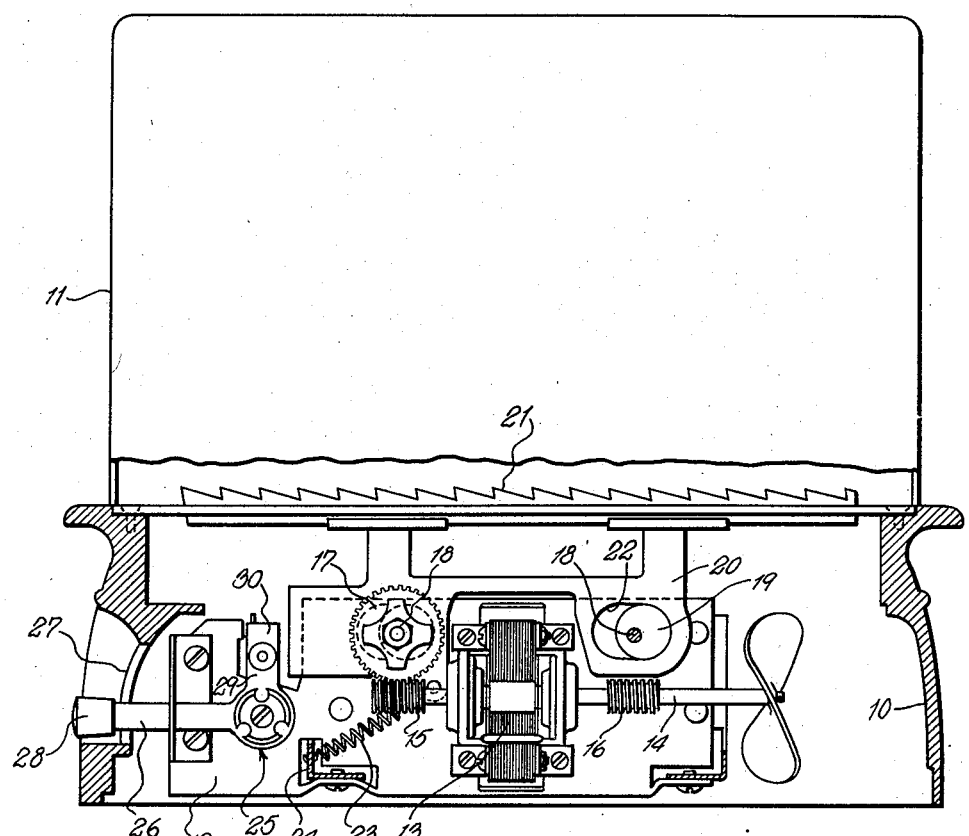
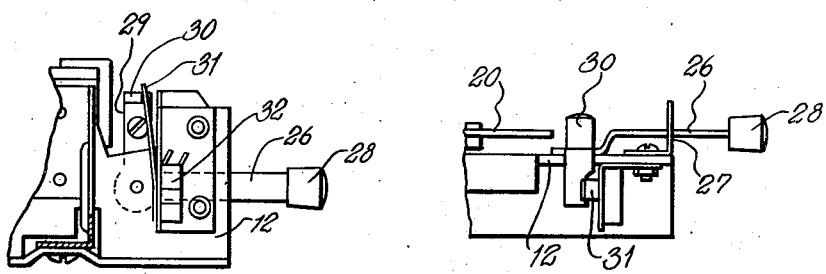
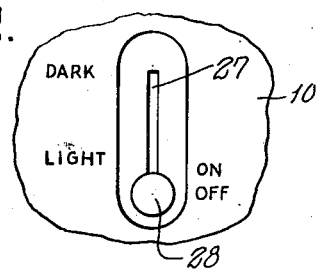
INVENTOR.
ALVIN C. GODDARD
BY Benj. T. Rauber
ATTORNEY Patented Apr. 17, 1951

2,549,375

UNITED STATES PATENT OFFICE 2,549,375

BREAD TOASTER

Alvin C. Goddard, Long Island, N. Y., assignor to Toast-O-Lator Co., Inc., Long Island City, N. Y., a corporation of New York Application December 8, 1949, Serial No. 131,780

4 Claims. (Cl. 99—386)

1

My present invention relates to a toaster of the type in which a slice of bread to be toasted is moved edgewise between a pair of heating elements as shown in my Patent 2,151,695, issued March 28, 1939.

In toasters of this general type a toast advancing element is moved in recurrent cycles upwardly and forwardly to engage the slice of bread to be toasted and move it a short distance forwardly then downwardly and then return it to the original position.

The slice advancing element is driven by a motor through a suitable eccentric to give it the required advancing and returning movements. The rate at which the slice is passed through the toaster, and accordingly the degree of toasting, is dependent upon the amplitude of the cycle and the amount that the slice is advanced for each cycle.

In my present invention I provide an advancing mechanism in which the amplitude of the advancing cycle and the degree of toasting is automatically controlled by a lever which operates the switch for the motor and heating elements. I also provide a common support for the motor and related elements and the switch and regulating control so that they may be readily assembled and inserted in the toaster without the necessity for adjustment of the relative positions of the elements.

The various features of the invention are illustrated, by way of example, in the accompanying drawings in which Fig. 1 is a side view, the lower part being in section, of a toaster embodying a preferred form of the invention;

Fig. 2 is a side view, from the opposite direction, of the switch and regulating elements;

Fig. 3 is a plan view of the switch and regulating elements;

Fig. 4 is an end view of a portion of the base of the toaster showing the position of the end of the operating lever.

In the embodiment of the invention shown in the accompanying drawings, the slice advancing elements are mounted in a hollow base 10 which supports an enclosure 11 for the heating elements between which the slice to be toasted passes. Within the base is secured a frame comprising a vertical plate 12 extending lengthwise of the direction of travel of the slice. On this base is mounted an electric motor 13 the shaft 14 of which carries a pair of worms 15 and 16, one at each side of the motor. Each worm engages a gear, of which one, indicated at 17, is shown;

2 the other being removed to show the eccentric for the toast advancing element.

Each of the gears 17 is mounted on a shaft 18 on which is fixed an eccentric 19, only one being shown as the other is covered by the gear 17. The shafts 18 are journalled in the frame 12, which may be stamped or formed with suitable holes to mount the motor and the gears.

Slidably mounted on the frame 12 is a toast advancing element 20 carrying serrated engaging elements 21 at its upper end. The slice advancing element is provided with a pair of slots, only one, indicated at 22, being shown; the other being hidden by the gear 17. The slots 22 extend horizontally in the direction of advancement of the slice and are shaped at their upper and lower and rear edges to fit the eccentrics 19 which are received in these slots. As the cams or eccentrics 19 rotate at the same speed and with the same relative angular positions, they raise the element 20 to a position to engage and support the lower edge of the slice and then move forwardly. If the slice advancing element 20 were held from longitudinal displacement the cams 19 would move forwardly in the slots 22 to approximately the forward edge thereof, thus passing in engagement with the respective slots. The slice advancing element is, however, pulled forwardly by a spring 23 secured at one end to an anchorage 24 in the frame and at its other end to the element 20. Accordingly, when the toast advancing element is lifted and the cams rotate in a forward direction the spring 23 pulls the element 20 forwardly to keep each cam in engagement with the rear edge of its respective slot. This would give the toast advancing element maximum amplitude or movement in a forward direction.

To limit the forward movement of the element 20 for each cycle, it is prevented from moving beyond a point which may be set or adjusted thereby giving a shorter advance to the slice for each cycle and a slower passage between the heating elements and providing a longer time for toasting. This adjustable stop is mounted on the plate 12 in fixed relation to the cams 19 and comprises a bell crank lever 25 provided in an opening in the plate 12 and having a horizontal control arm 26 which projects through a slot 27 in the base 10 and is provided with a knob 28 to be engaged by the fingers so that the arm 26 may be tilted upwardly or downwardly.

Extending upwardly from the pivotal point of the lever 25 is a vertical arm 29 carrying at its upper edge a top piece 30 extending across the plate 12 so that one part of this cross piece is in the path of the slice advancing element 20 and limits the position of stopping of the latter, depending upon the swing of the horizontal arm 26. Another part of the top piece serves to engage a switch spring 31 extending upwardly from a control switch 32 mounted on the plate 12. The relationship of the switch and spring 21 to the top piece 30 is such that when the lever arm 26 is in its lowermost position the vertical arm 29 and top piece 30 press the spring 31 backwardly onto the switch 32 to open the latter.

When the arm 26 is swung upwardly, moving the top piece 30 away from the spring 31, the latter springs forwardly closing the switch 32. If the arm 26 is stopped immediately after the switch is closed the top piece 30 will be at its greatest distance from the slice advancing element and the amplitude or movement of the latter will be a maximum, thereby providing rapid movement of the slice through the passage between the heating elements and giving a light toasting effect. If the arm is swung farther upwardly the top piece will move closer toward the slice advancing element, limiting the forward movement of the latter, decreasing its amplitude or distance of movement and delaying the passage of the slice so that it is subjected to a longer heating time and darker toast is obtained.

The front part of the toaster may be marked as shown in Fig. 4 designating light and dark toast and off and on for the switch.

By having the switch control and heating control mounted on a common frame or plate with the motor and eccentrics, this plate may be stamped or punched with the respective openings for the eccentric shaft, motor and pivot of the lever so that they will be accurately positioned when placed on the plate and no adjustment is required for accurate positioning. Also the above arrangement is one in which the control of the toast is readily accessible and being connected to the switch will be made automatically upon turning on the switch.

Having described my invention, what I claim is:

1. A toaster having a supporting frame, a slice engaging and advancing element in slidable relation to said frame, said element having a slot elongated in the direction of travel of said slice, a spring acting on said element in the direction of advancement of said slice, a motor mounted on said frame, an eccentric driven by said motor engaging the top, bottom and rear edges of said slot and an adjustable stop mounted on said frame in fixed relation thereto to limit the forward movement of said element.

2. The toaster of claim 1 having a lever pivoted on said frame in fixed relation to said motor and said eccentric and pivoted to move said stop to and from said slice advancing element.

3. The toaster of claim 1 having a switch mounted on said frame and a lever pivoted on said frame in fixed relation to said switch and to said eccentrics and tiltable to open and close said switch and to move said stop to or from said toast advancing element.

4. The toaster of claim 1 having an enclosing base, an electric switch mounted on said frame and a lever pivoted on said frame and having one arm to engage said switch and to move said stop to or from said slice advancing element, said base having a slot and said lever having an arm extending through said slot.

ALVIN C. GODDARD.

REFERENCES CITED

The following references are of record in the file of this patent:

UNITED STATES PATENTS

| Number | Name | Date |
|---|---|---|
| 2,112,076 | De Matteis | Mar. 22, 1938 |
| 2,149,566 | Anderson | Mar. 7, 1939 |
| 2,151,695 | Goddard | Mar. 28, 1939 |
| 2,188,309 | Pentecost | Jan. 30, 1940 |